US009659338B2

(12) United States Patent
Lim

(10) Patent No.: US 9,659,338 B2
(45) Date of Patent: May 23, 2017

(54) METHOD AND SYSTEM FOR ADAPTIVE CONTENT PROTECTION

(71) Applicant: DIGIFY PTE LTD, Singapore (SG)

(72) Inventor: Augustine Lim, Singapore (SG)

(73) Assignee: Digify PTE LTD, Singapore (SG)

( * ) Notice: Subject to any disclaimer, the term of this patent is extended or adjusted under 35 U.S.C. 154(b) by 17 days.

(21) Appl. No.: 14/714,236

(22) Filed: May 15, 2015

(65) Prior Publication Data
US 2016/0335733 A1    Nov. 17, 2016

(51) Int. Cl.
*G06K 9/00*     (2006.01)
*G06T 1/00*     (2006.01)
*G06F 3/0488*   (2013.01)
*G06F 3/0354*   (2013.01)
*G06F 3/0484*   (2013.01)

(52) U.S. Cl.
CPC ........ *G06T 1/0028* (2013.01); *G06F 3/03543* (2013.01); *G06F 3/04845* (2013.01); *G06F 3/04883* (2013.01); *G06T 2201/0051* (2013.01)

(58) Field of Classification Search
None
See application file for complete search history.

(56) References Cited

U.S. PATENT DOCUMENTS

2013/0120369 A1* 5/2013 Miller .................... G06T 17/00
345/419

* cited by examiner

*Primary Examiner* — Atiba O Fitzpatrick
(74) *Attorney, Agent, or Firm* — Evergreen Valley Law Group; Kanika Radhakrishnan

(57) ABSTRACT

Methods, systems, devices and applications for adaptive content protection for image data for use with interactive media display systems are disclosed. Initially, image data is obtained for display. A generated graphical obscuring element is then provided for the image data, the obscuring element generated for display overlaying the image data, wherein the obscuring element is generated to obscure, to a moderate degree, at least a portion of an underlying displayed image. On display of the image and the overlaying obscuring element, and in response to a prompt, the degree to which the obscuring element obscures the underlying displayed image is altered.

19 Claims, 8 Drawing Sheets

METHOD AND SYSTEM FOR ADAPTIVE CONTENT PROTECTION

TECHNICAL FIELD

Embodiments of the disclosure relate generally to content protection and copy protection. Embodiments relate more particularly to methods, systems, devices and applications for adaptive content protection for image data for use with interactive media display systems.

BACKGROUND

Content protection or copy protection is a method to prevent the production of content such as text, images, video and other media. Methods of content protection and copy protection, such as digital watermarking, are known. Today, traditional watermarking is across the page, and is at a fixed position or positions on the page. Typically watermarking is one way to trace who has leaked the information, by placing the identifier of the recipient on the content.

There are multiple issues with this approach. One, the watermark interferes with the reading experience. The text of the watermark covers the actual text, making it partially unreadable. Two, the watermark does not cover the page sufficiently, rendering most of the page exposed to the analog hole.

The analog hole is a fundamental and inevitable vulnerability in copy protection schemes. It is relatively easy to digitally recapture human-perceptible form of content with another device, thereby fundamentally circumventing any and all restrictions placed on copyrighted digitally distributed work.

Typically watermarking is one way to trace who has leaked the information, by placing the identifier of the recipient on the content. However, this causes the content to become very difficult to read.

In addition, the watermarking in previously considered methods usually comprise of a block of text or a mark across the screen, interfering with the actual text to be read. This causes the text to become illegible in many cases.

In the light of the above discussion, there appears to be a need for providing improvements upon the known devices and methods.

OBJECT OF INVENTION

The principal object of the embodiments herein is to provide a method for adaptive content protection for image data for use with interactive media display systems.

SUMMARY

The above-mentioned needs are met by a system and method for adaptive content protection for image data for use with interactive media display systems.

A method for adaptive content protection for image data for use with an interactive media display system, the method includes obtaining image data for display. Further, the method includes providing for the image data a generated graphical obscuring element, the obscuring element generated for display overlaying the image data, wherein the obscuring element is generated to obscure, to a moderate degree, at least a portion of an underlying displayed image. Furthermore, the method includes altering the degree to which the obscuring element obscures the underlying displayed image on display of the image and the overlaying obscuring element and in response to a prompt.

A computer program product stored on a non-transitory computer readable medium that when executed by a processor performs a method of adaptive content protection for image data for use with an interactive media display system. The computer program product includes obtaining image data for display. Further, the computer program product includes providing for the image data a generated graphical obscuring element, the obscuring element generated for display overlaying the image data, wherein the obscuring element is generated to obscure, to a moderate degree, at least a portion of an underlying displayed image. Furthermore, the computer program product includes altering the degree to which the obscuring element obscures the underlying displayed image on display of the image and the overlaying obscuring element and in response to a prompt.

An example of a system for identifying a location within a region using scannable code markers includes a user interactive display device includes a memory, a communication interface configured to communicate with a server system, a display, a user interface device and a processor module. The system is configured to obtain from the memory and/or the server system and the image data for display on the user display device. Further, the processor generates for the image data a graphical obscuring element, the obscuring element generated for display overlaying the image data, wherein the obscuring element is generated to obscure, to a moderate degree, at least a portion of an underlying displayed image. Furthermore, processor alters the degree to which the obscuring element obscures the underlying displayed image on the display of the image and the obscuring element on the user display device and in the response to a prompt.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a system and method for adaptive content protection for image data for use with interactive media display systems. The following detailed description is understand that variations can be substituted that are within the scope of the invention as described.

Adaptive watermarking makes it easy for the recipient to view the content. The present invention makes the content more accessible by exposing more of the content, while the content stays protected and marked confidential. Further, the present invention is user-friendly and adaptive by allowing a change in the position of the watermark and opacity and size of the watermark. Furthermore, the present invention shows people that they are trusted by lowering the opacity once people touch the watermark.

In an embodiment, the following steps are taken, with reference to FIG. 1*a*, FIG. 1*b*, FIG. 1*c* and FIG. 2:
 a. The watermark (e.g. email of recipient) 102 is displayed on a screen 104 with an opaque or semi-transparent background 106, across the screen 104.
 b. The watermark 102 can be moved around the screen 104.
 c. Once the user touches the watermark 102, the watermark 102 background either/both:
  1. Shrinks in size
  2. Becomes more transparent or disappears.

Figure 1A:
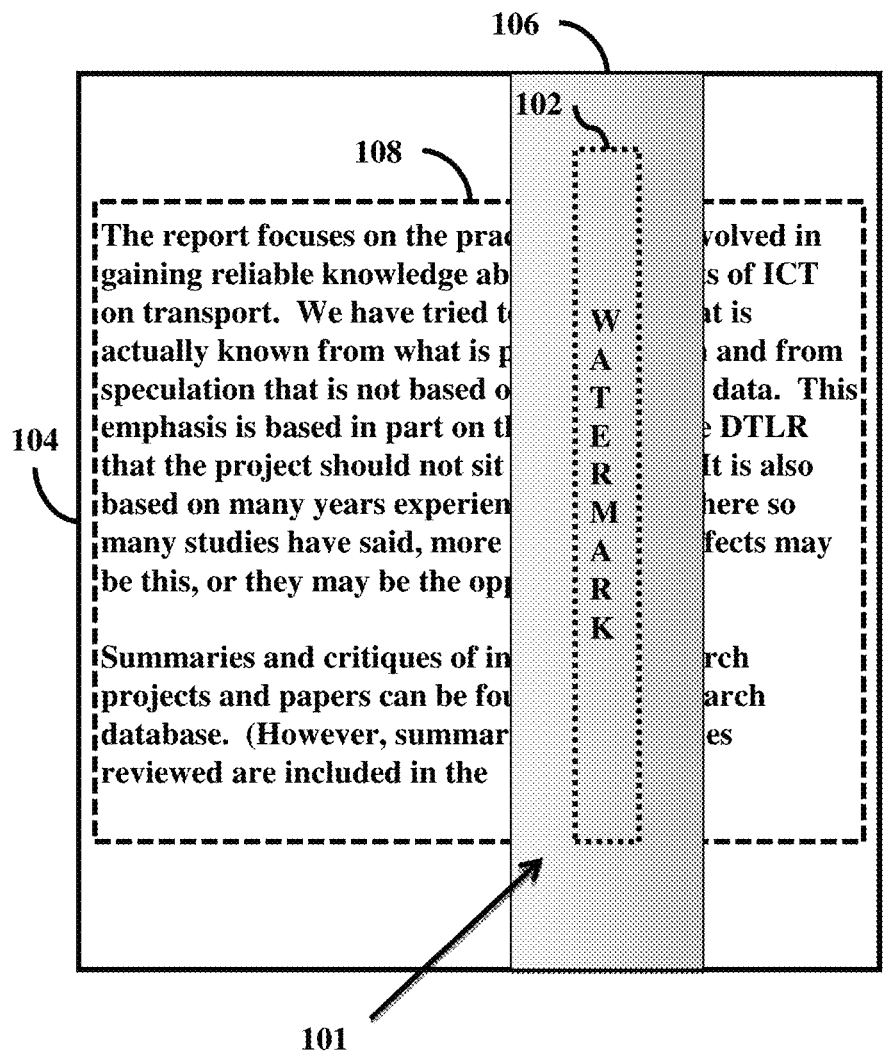
FIG. 1a, FIG. 1b and FIG. 1c are diagrams illustrating examples of display functionality, according to embodiments of the invention.
Figure 1B:
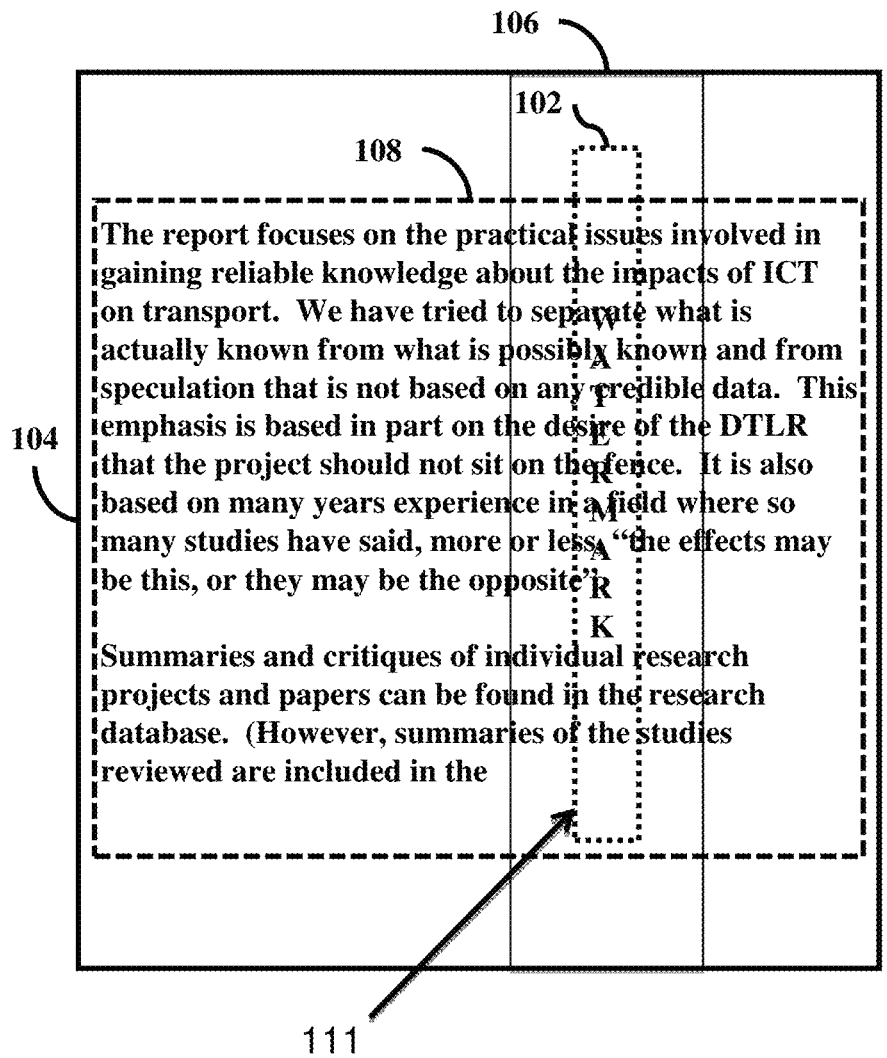
Figure 1C:
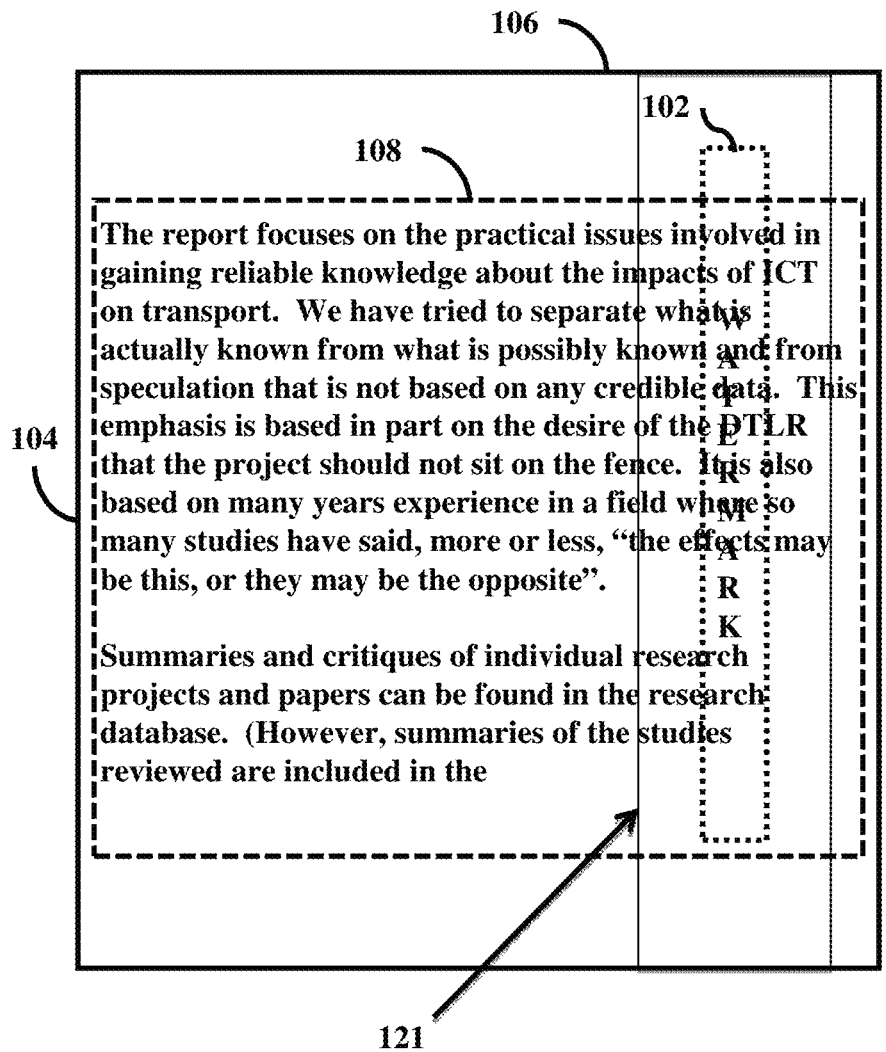

FIG. 1*a* illustrates an initial state in an embodiment in which the label and watermark 101 are opaque, covering up the underlying text (which could also be an image or other data) 108. In FIG. 1*b*, the user clicks, touches the screen or otherwise interacts, and the label is made transparent 111. The user can now see more of the text which was previously hidden. However, some text remains illegible behind the text of the watermark. In FIG. 1*c*, the user has now also moved the label 121, so that the remaining text can be read.

Figure 2:
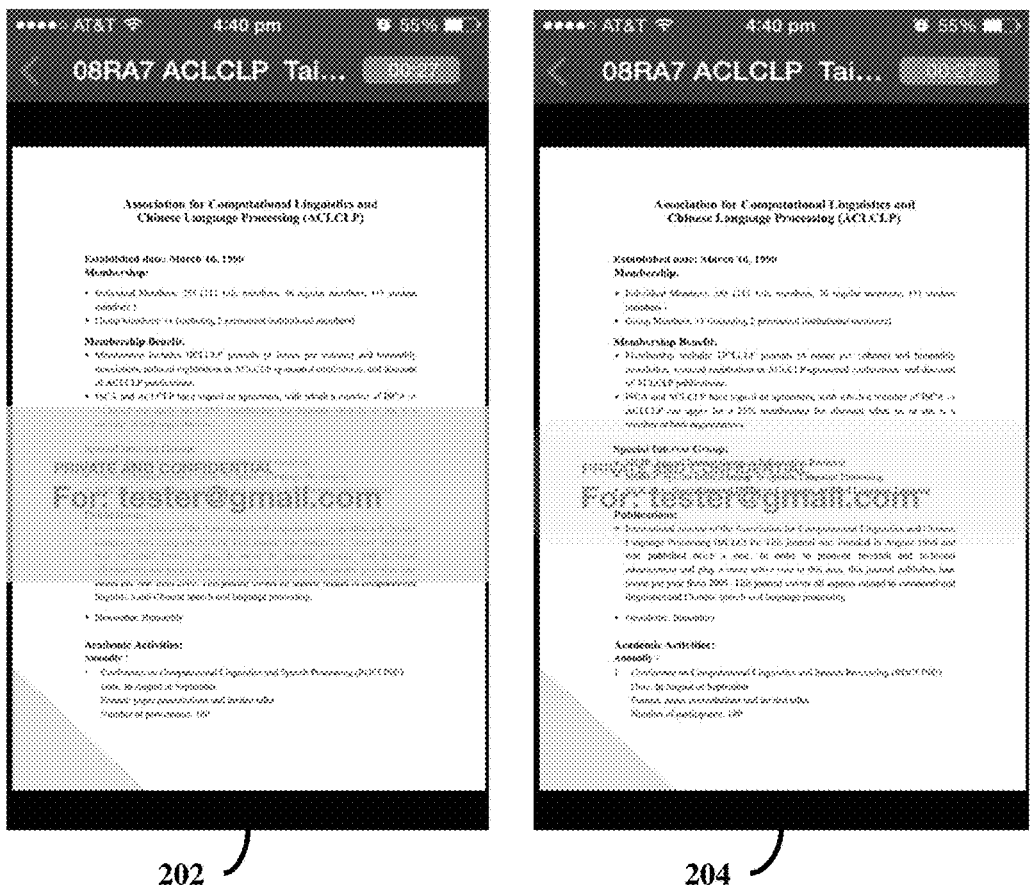
FIG. 2 is a diagram illustrating an example of display functionality, according to embodiments of the invention.

FIG. 2 shows (left) an initial state 202 in another embodiment. Screenshot two (right) shows a second state 204 where the watermark has been pressed—the label has become less opaque, and the size reduced. The watermark can be moved around.

A simple algorithm according to an embodiment proceeds as follows:
Initialization:
 1. A custom view is created for the content.
 2. Initialize screen size.
 3. Adjust watermark size to a fraction of the screen size.
 4. Paint opaque background and foreground text. Foreground text can be the email of the recipient or other marks, such as the photo of the recipient.
 5. Make opaque background slightly transparent.
Operation:
 1. Detect if figures or cursor is on the watermark.
 2. Detect the fingers/cursor movement on the screen.
 3. If the fingers/cursor are off the watermark, then scroll/zoom the underlying layer independently of the watermark.
 4. If the fingers are on the watermark, then make the watermark smaller, and make the background more transparent.
 5. If there is movement while the fingers are on the watermark, then move the watermark.
 6. Check the boundaries of the screen, and ensure that the watermark does not move out of the screen.

Figure 3:
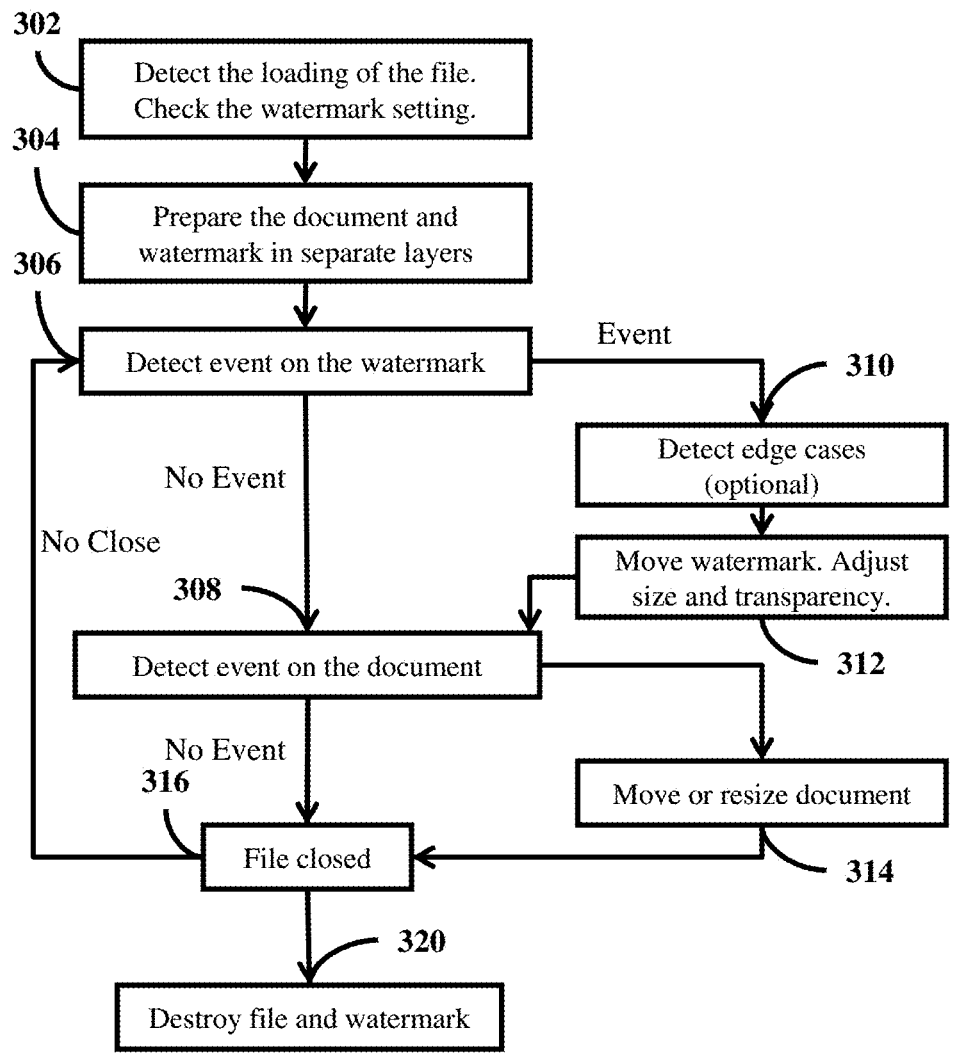
FIG. 3 is a diagram illustrating examples of steps of a method, according to an embodiment of the invention.

In an embodiment, an algorithm for implementing embodiment proceeds as follows, with reference to FIG. 3:
 1. At step 302, the file is loaded. Check setting of the file on whether a watermark is applied.
 2. At step 304, if watermark is to be applied, prepare the watermark.
  a) At step 306, detect the height and width of the screen
  b) Dynamically calculate the height and width of the protective label.
  c) Draw the protective label and the watermark.
  d) Make the protective label semi-transparent or blurred. (optional)
  e) Detect center, and move the label to the center. (optional)
  f) Put text or a graphic on the protective label (thereafter "element"). This can include the purpose of the file, as well as the email address of the recipient.
  g) Separate the label and the underlying file, as two separate layers.
 3. Prepare the display of the file in the background, show the file together with the watermark.
 4. At step 306, an event is detected on the label:
  a) On touch devices: detect the touch of the screen on the protective label or the element.
  b) On web and desktop: detect click and hold of the protective label or the element.
  c) On event, make the protective label less obtrusive and movable:
   i. Shrink the protective label
   ii. Make the protective label more transparent, or totally transparent
   iii. Move label together with finger movement (touch devices) or mouse cursor (click and hold, or automatic) by recalculating the position and redrawing the labels and elements.
   iv. Detect the end of the event, and make the protective label and text stationary.
  d) At step 308, an event is detected on the document (optional)
   i. The document can be moved and zoomed independently from the watermark.
   ii. The protective and text is held stationary.
   iii. On touch devices, detect situations where the touch movement is across the file into the protective label, and ignore the touch on the protective label.
  e) At step 310, edge cases (optional) are detected (detect situations where the watermarking less useful e.g. over a white area of the screen)
   i. Detect blank or continuous even areas of the screen.
   ii. At step 312, ensure that the watermark does not exceed the boundaries of the area.
   iii. At step 314, if it is at the edge, adjust the size of the watermark or boundaries.
  f) At step 316, the file is closed
   i. At step 320, file and watermark is destroyed.

Certain differences between embodiments of the invention and previously considered methods are described below:
 1. Some previously considered methods have no text on the covered portion.

2. Central to the movement is the text, not the covering portion. The covering portion is actually made semi or totally transparent.
3. Transparency and size transformation of the covering portion.
4. The purpose of the invention is different. Previously considered methods are to obscure everything and reveal a little. The watermark shows the entire page but obscures a portion of the page.
5. The protective label and watermarks are on two separate layers. The underlying layer of the file can be resized or moved around. This is not the case in previously considered methods.
6. One variant is to touch to move the watermark to a random area of the screen, not following the cursor or window movement.
7. Another variant is to have the window move without clicking.
8. Some previously considered methods do not detect where the mark does not make sense e.g. over white or blank areas.
9. The text element and labels can be dynamic e.g. change of graphic or text, or colors, depending on the position of the element or type of document.
10. One variant is to have the label and the text as one single layer and redraw the entire layer, so that it cannot be separated.

Certain advantages of embodiments of the invention are as follows:
1. Typical previously considered watermarking makes the text or content very difficult to read due to interference. Our invention does not interfere with the reading of the text as it is movable and semi-transparent once touched or clicked upon.
2. On mobile, while the user touches the screen, the user is actually blocking the mobile screen with his fingers. Hence a photo of the screen is incomplete.
3. If the user tries to take a photo of the watermarked screen without his finger on the screen, the watermark is more apparent as there is an opaque or semi-opaque background blocking the screen.
4. If the user is having a hand on the screen, or a hand on the mouse, it is more challenging for them to take photos of the screen.
5. If the user is taking a screenshot, the watermark is on the photo, creating a psychological deterrent for someone to leak the information, as it can be traced back.
6. It will take more effort to piece together the screen after multiple screenshots, with the watermark in place.

Figure 4:
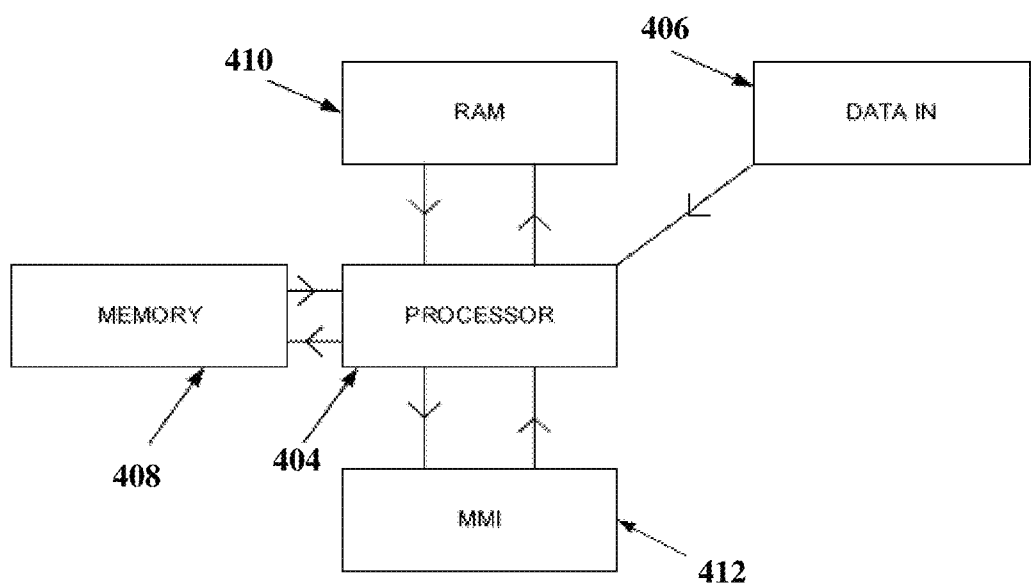
FIG. 4 is a diagram illustrating typical features of an interactive system, according to an embodiment of the invention.

Referring to FIG. 4, certain of the above embodiments of the invention may be conveniently realized as a computer system (such as a server or an interactive user device) suitably programmed with instructions for carrying out the steps of the methods according to the invention.

For example, a processor 404 is able to implement such steps as obtaining image data for display; providing for the image data a generated graphical obscuring element, the obscuring element generated for display overlaying the image data, wherein the obscuring element is generated to obscure, to a moderate degree, at least a portion of an underlying displayed image; and on display of the image and the overlaying obscuring element, and in response to a prompt, altering the degree to which the obscuring element obscures the underlying displayed image.

Data can be received by port 406 which could be a reader for portable data storage media (e.g. CD-ROM); a direct link with apparatus or a connection to a network.

Software applications loaded on memory 408 are executed to process the data in random access memory 410.

A Man—Machine interface 412 typically includes a keyboard/mouse/screen combination and/or touch screen (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

Figure 5:
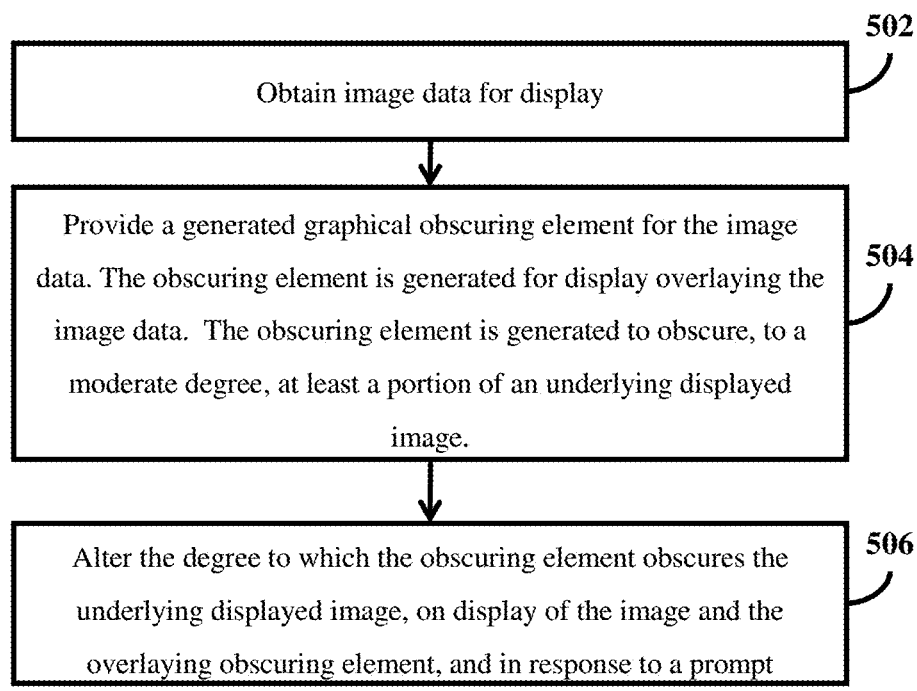
FIG. 5 is a flow diagram of the method described herein, according to an embodiment of the invention.

FIG. 5 is a flow diagram of the method described herein, according to an embodiment of the invention. The method begins at step 505.

At step 502, image data for display is obtained.

At step 504, a generated graphical obscuring element for the image data is provided. The obscuring element is generated for display overlaying the image data. The obscuring element is generated to obscure, to a moderate degree, at least a portion of an underlying displayed image.

The generated graphical obscuring element includes a watermark and an identifier associated with the user of the interactive display system.

Further, the generated obscuring element can be of different types, such as alignment, shapes and sizes. The alignment can be either vertical or horizontal. The shapes can be a circle, elliptical, strange shapes and images.

At step 506, alter the degree to which the obscuring element obscures the underlying displayed image, on display of the image and the overlaying obscuring element, and in response to a prompt. The display location of the obscuring element is altered. The degree to which the obscuring element obscures the underlying displayed image is reduced. Typically, the opacity level of the graphical obscuring element is reduced. Further, reducing the degree includes altering a size and/or shape of the graphical obscuring element.

A user interaction input is detected as the prompt. Further, an input is received indicating a user interaction with the displayed overlaying obscuring element through a user interface of the interactive media display system. The interaction input indicates movement action and moving the obscuring element accordingly.

The user interaction with the obscuring element detected includes a click on a mouse of the interactive system where the displayed cursor of the mouse is located in the region of the displayed obscuring element. A user touches on a touch screen of the interactive system, where the touch location is in the region of the displayed obscuring element.

A blank area of the image data is detected for display, and movement of the obscuring element into the blank area is restricted.

The method ends at step 506.

System Block Diagram

Figure 6:
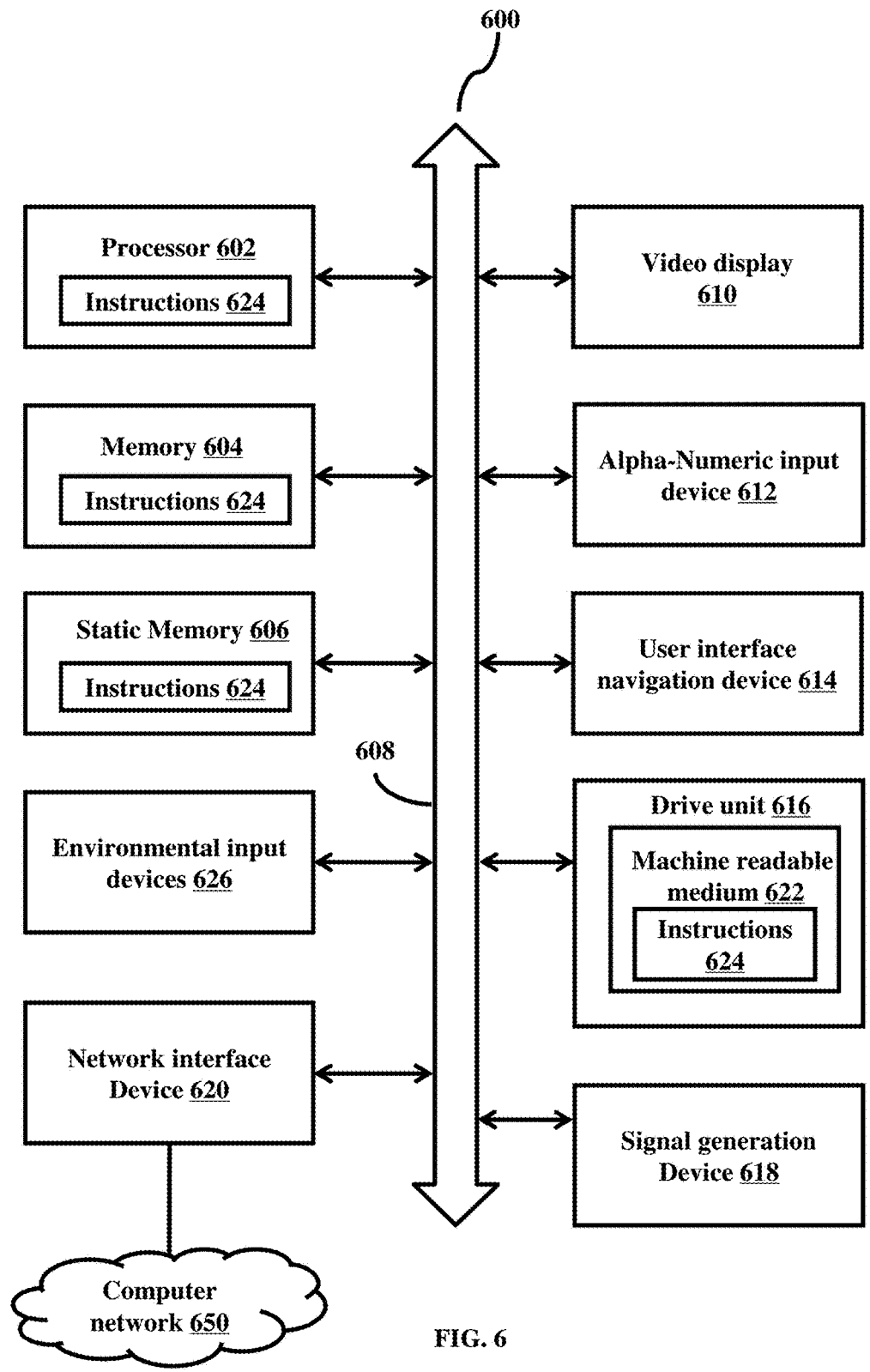
FIG. 6 is a block diagram of a machine in the example form of a computer system within which instructions for causing the machine to perform any one or more of the methodologies discussed herein may be executed.

FIG. 6 is a block diagram of a machine in the example form of a computer system within which instructions for causing the machine to perform any one or more of the methodologies discussed herein may be executed.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618(e.g., a speaker), and a network interface device 620. The computer system 600 may also include a environmental input device 626 that may provide a number of inputs describing the environment in which the computer system 600 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 624 may further be transmitted or received over a computer network 650 using a transmission medium. The instructions 624 may be transmitted using the network interface device 620 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method of adaptive content protection for image data for use with an interactive media display system, the method comprising the steps of:
   obtaining image data for display from computer data to the user on the interactive media display system;
   providing for the image data a generated graphical obscuring element, the obscuring element including (i) a watermark and (ii) an underlying layer, each one separately sizable and movable, the watermark being associated with a recipient of the content to facilitate tracing leaked content, the obscuring element generated for display to the user on the interactive media display system and overlaying the image data, wherein the obscuring element is generated to obscure, to a predetermined, alterable degree, at least a portion of an underlying displayed image; and
   on display of the image and the overlaying obscuring element to the user on the interactive media display system, and in response to a prompt through a graphical user interface of the interactive media display system, altering the degree to which the obscuring element obscures the underlying displayed image.

2. The method according to claim 1, wherein the step of altering the degree to which the obscuring element obscures comprises:
   detecting a user interaction input through the graphical user interface of the interactive media display system as the prompt.

3. The method according to claim 2, wherein the step of detecting comprises receiving an input indicating a user interaction with the displayed overlaying obscuring element via a user interface of the interactive media display system.

4. The method according to claim 3, wherein
   the user interaction with the obscuring element detected comprises one of: a click on a mouse of the interactive system, where the displayed cursor of the mouse is located in the region of the displayed obscuring element; and
   a user touch on a touch screen of the interactive system, where the touch location is in the region of the displayed obscuring element.

5. The method according to claim 1, wherein the step of altering the degree to which the obscuring element obscures comprises altering a display location of the obscuring element.

6. The method according to claim 1, wherein the step of altering the degree to which the obscuring element obscures comprises reducing the degree to which the obscuring element obscures the underlying displayed image.

7. The method according to claim 6, wherein the step of reducing the degree comprises reducing an opacity level of the graphical obscuring element.

8. The method according to claim 6, wherein the step of reducing the degree comprises altering a size and/or shape of the graphical obscuring element.

9. The method according to claim 1, wherein the generated graphical obscuring element comprises an identifier associated with the user of the interactive display system.

10. The method according to claim 3, wherein the step of detecting the user interaction input as the prompt comprises: determining that the interaction input indicates a movement action; and moving the obscuring element accordingly.

11. The method according to claim 10, further comprising: detecting a blank area of the image data for display; and restricting movement of the obscuring element into the blank area.

12. The method according to claim 1, wherein the watermark is displayed on the screen as one of opaque and semi-transparent over the background across the screen.

13. The method according to claim 11, further comprising: checking the boundaries of the blank area to ensure that the obscuring element is within boundary of the blank area.

14. The method according to claim 1, wherein the obscuring element is one of different alignments, shapes and sizes, wherein the alignment is one of vertical and horizontal, and the shapes is one of circle, elliptical, other shapes and images.

15. A server system comprising:
   a memory;
   a communication interface configured to communicate with user interactive display devices; and
   a processor module,
   the server system configured to:
   obtain from the memory image data for communication to and display on the user display device;
   generate for the image data a graphical obscuring element, the obscuring element including (i) a watermark and (ii) an underlying layer, each one separately sizable and movable, the watermark being associated with a recipient of the content to facilitate tracing leaked content, the obscuring element generated for display overlaying the image data, wherein the obscuring element is generated to obscure, to a predetermined, alterable degree, at least a portion of an underlying displayed image; and
   generate a component associated with the obscuring element adapted to, on display of the image and the obscuring element on the user display device, and in response to a prompt, alter the degree to which the obscuring element obscures the underlying displayed image.

16. A user interactive display device comprising:
   a memory;
   a communications interface configured to communicate with a server system;
   a display;
   a user interface; and
   a processor module,
   the system configured to:
   obtain, from the memory and/or from the server system, image data for display on the user display device; and
   by the processor, generate for the image data a graphical obscuring element, the obscuring element including (i)

a watermark and (ii) an underlying layer, each one separately sizable and movable, the watermark being associated with a recipient of the content to facilitate tracing leaked content, the obscuring element generated for display overlaying the image data, wherein the obscuring element is generated to obscure, to a predetermined, alterable degree, at least a portion of an underlying displayed image; and on display of the image and the overlaying obscuring element on the user display device, and in response to a prompt, alter the degree to which the obscuring element obscures the underlying displayed image.

17. The user interactive display device according to claim 16 wherein the user interface receives an input indicating a user interaction with the displayed overlaying obscuring element.

18. The user interactive display device according to claim 17, wherein the user interaction is one of a click on a mouse of the interactive system and a user touch on a touch screen of the interactive system.

19. A computer program application comprising:

a non-transitory computer-readable medium; and computer program code provided on the non-transitory computer-readable medium, and adapted, when loaded into or run on a computer processor having a data read/write device for reading the computer program code from the non-transitory computer-readable medium, to cause the computer processor to become a system, or to carry out a method, according to any preceding claim.

* * * * *